(12) United States Patent
Foust

(10) Patent No.: US 8,079,508 B2
(45) Date of Patent: Dec. 20, 2011

(54) SPACED PLATE HEAT EXCHANGER

(76) Inventor: Harry D. Foust, La Crosse, WI (US)

( * ) Notice: Subject to any disclaimer, the term of this patent is extended or adjusted under 35 U.S.C. 154(b) by 536 days.

(21) Appl. No.: 12/378,545

(22) Filed: Feb. 17, 2009

(65) Prior Publication Data
US 2009/0294110 A1 Dec. 3, 2009

Related U.S. Application Data

(60) Provisional application No. 61/130,280, filed on May 30, 2008.

(51) Int. Cl.
B23K 31/02 (2006.01)
(52) U.S. Cl. .......... 228/183; 228/190; 228/221
(58) Field of Classification Search .......... None
See application file for complete search history.

(56) References Cited

U.S. PATENT DOCUMENTS

| 2,269,523 | A |   | 1/1942  | Deutsch         |          |
|-----------|---|---|---------|-----------------|----------|
| 3,139,679 | A |   | 7/1964  | Saj             |          |
| 3,216,732 | A |   | 11/1965 | Foust           |          |
| 3,364,548 | A |   | 1/1968  | Marco           |          |
| 3,474,513 | A | * | 10/1969 | Allingham       | 29/890.036 |
| 3,570,593 | A |   | 3/1971  | Isaaz           |          |
| 3,601,185 | A |   | 8/1971  | Rothman         |          |
| 4,276,927 | A |   | 7/1981  | Foust           |          |
| 4,505,419 | A | * | 3/1985  | Steeb           | 228/183  |
| 4,626,295 | A | * | 12/1986 | Sasaki et al.   | 148/528  |
| 4,804,041 | A |   | 2/1989  | Hasegawa et al. |          |
| 5,180,098 | A | * | 1/1993  | Halstead et al. | 228/183  |
| 5,333,683 | A |   | 8/1994  | Arriulou et al. |          |
| 5,460,317 | A |   | 10/1995 | Thomas et al.   |          |
| 5,464,145 | A | * | 11/1995 | Park et al.     | 228/183  |
| 5,813,592 | A |   | 9/1998  | Midling et al.  |          |
| 6,035,928 | A |   | 3/2000  | Ruppel et al.   |          |
| 6,637,109 | B2 | * | 10/2003 | Nyqvist        | 29/890.03 |
| 6,708,869 | B2 | * | 3/2004  | Hyogo et al.   | 228/183  |
| 6,923,362 | B2 |   | 8/2005  | Mishra         |          |
| 7,124,812 | B1 |   | 10/2006 | Agee et al.    |          |
| 7,354,657 | B2 |   | 4/2008  | Mishra         |          |
| 7,771,840 | B2 | * | 8/2010  | Ueda et al.    | 428/654  |
| 2001/0054500 | A1 |  | 12/2001 | Raybould et al. |         |
| 2002/0153129 | A1 |  | 10/2002 | White et al.    |         |
| 2003/0056368 | A1 | * | 3/2003 | Nyqvist        | 29/890.03 |
| 2003/0077474 | A1 |   | 4/2003  | Rabinkin et al. |         |
| 2007/0214641 | A1 | * | 9/2007 | Bonnet et al.  | 29/890.03 |
| 2009/0065178 | A1 | * | 3/2009 | Kasezawa et al.| 165/104.19 |
| 2009/0145909 | A1 | * | 6/2009 | Hausberger     | 220/581  |
| 2009/0260794 | A1 | * | 10/2009 | Minami et al. | 165/182  |
| 2009/0308582 | A1 | * | 12/2009 | Nagurny et al.| 165/167  |
| 2011/0011570 | A1 | * | 1/2011 | Levings et al. | 165/166  |

FOREIGN PATENT DOCUMENTS

| JP | 56-105866 | A | * | 8/1981  |
| JP | 57-064472 | A | * | 4/1982  |
| JP | 59-197375 | A | * | 11/1984 |
| JP | 06-238432 | A | * | 8/1994  |

* cited by examiner

Primary Examiner — Kiley Stoner
(74) Attorney, Agent, or Firm — Robert J. Harter

(57) ABSTRACT

A brazed aluminum counter-flow heat exchanger particularly suited for use in Ocean Thermal Energy Conversion is produced by assembling and welding subassemblies of corrugated fins that were previously vacuumed brazed in a stacked group. After the brazing operation, the stacked group of subassemblies are later separated and rearranged to create a subsequent stack of alternating layers of corrugated layers and layers having wide open saltwater passageways. To complete the unit, a friction stir welding process provides final exterior weld seams that penetrate to the internal saltwater passageways in the heat exchanger. The full weld penetration eliminates corrosion-conducive crevices at the welded joints, thus making the aluminum heat exchanger suitable for saltwater use.

11 Claims, 16 Drawing Sheets

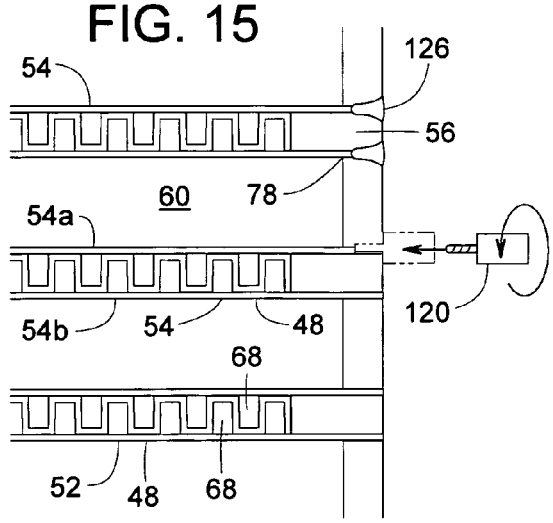
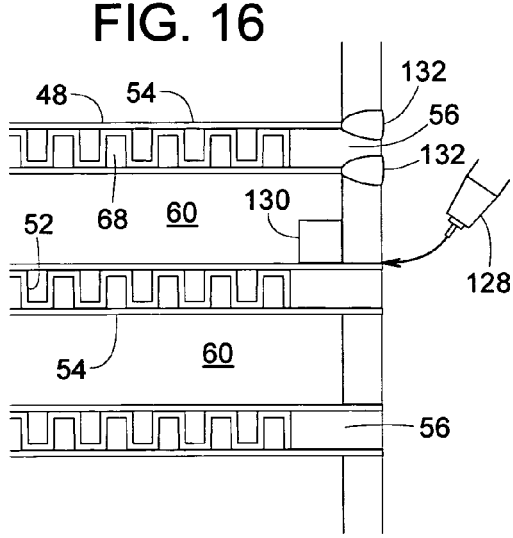
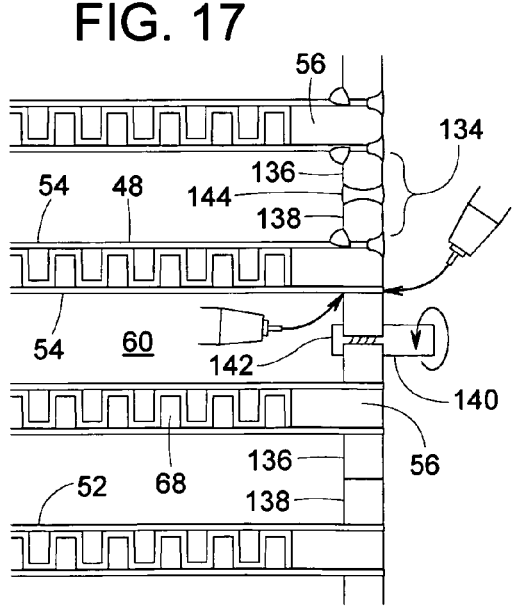

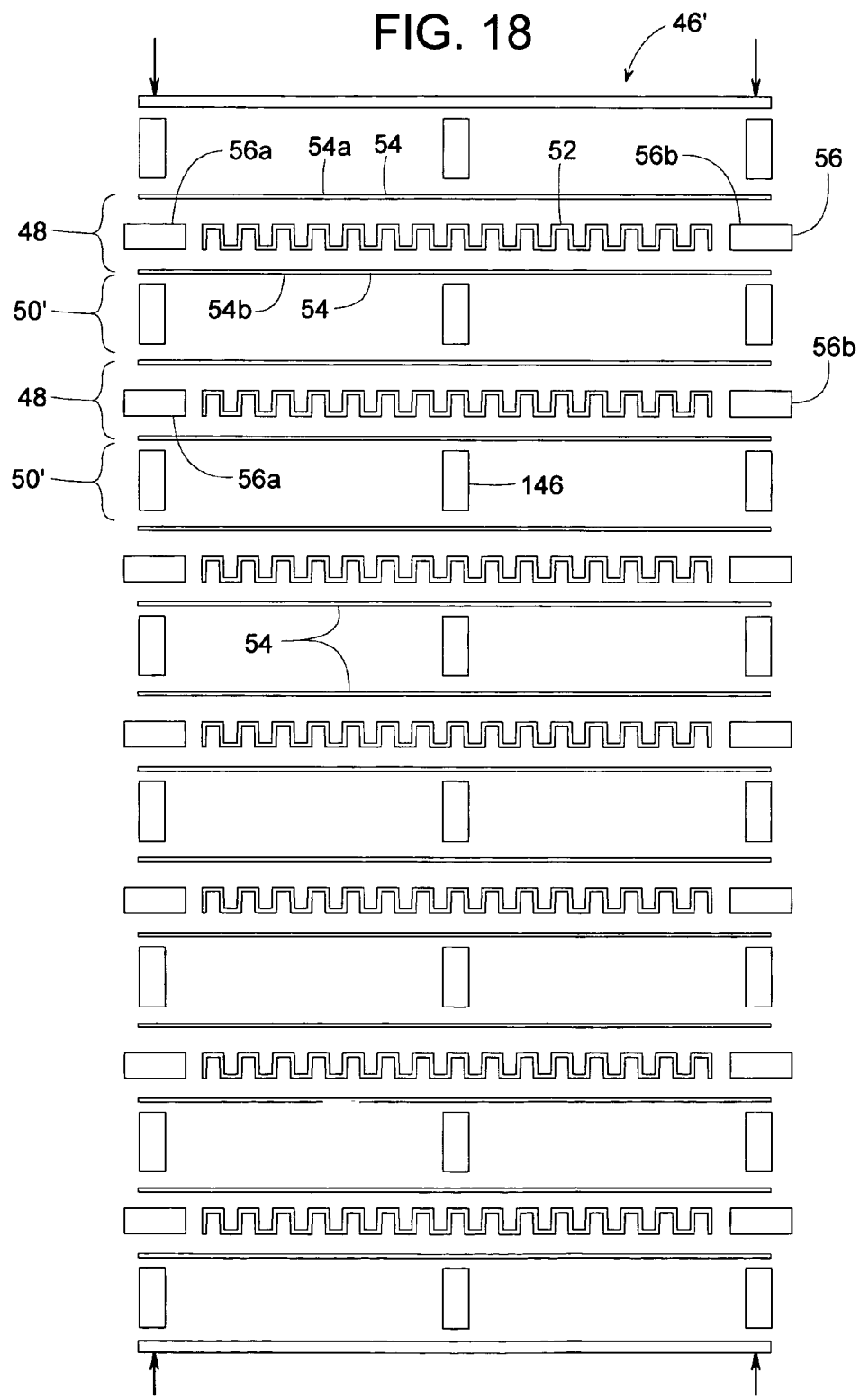

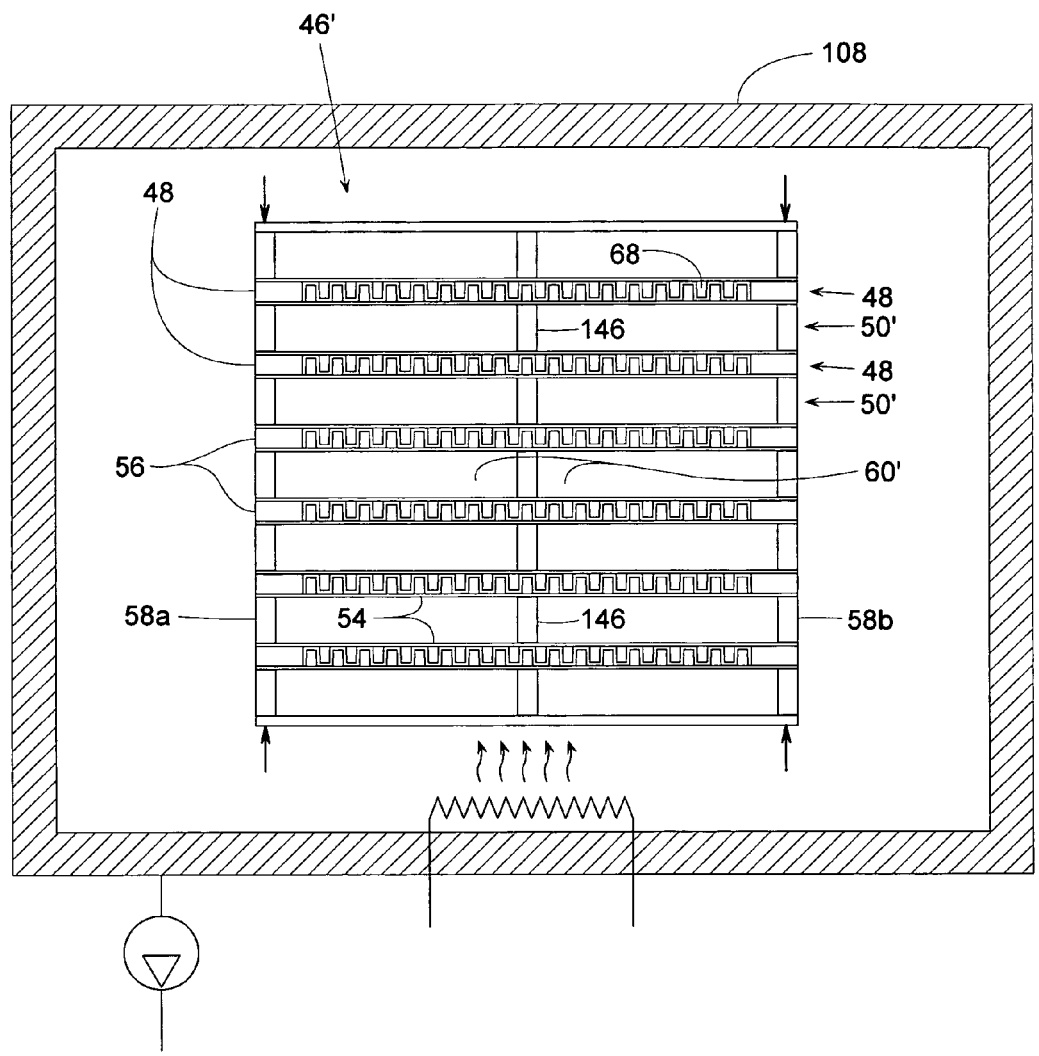

SPACED PLATE HEAT EXCHANGER

CROSS REFERENCE TO RELATED APPLICATIONS

This application claims the benefit of provisional patent application Ser. No. 61/130,280, filed May 30, 2008 by the present inventor.

FIELD OF THE INVENTION

The subject invention generally pertains to heat exchangers and more specifically to those comprised of stacked aluminum sheets.

BACKGROUND

Many heat exchangers transfer heat between two fluids, wherein the fluids flow through the heat exchanger in a cross-flow pattern, counter-flow pattern, or a parallel-flow pattern. In a cross-flow pattern the fluids flow generally perpendicular to each other, as disclosed in U.S. Pat. No. 7,124,812. In a parallel-flow pattern, the two fluids flow in generally the same direction. In a counter-flow pattern, the two fluids flow generally parallel to each other but in opposite directions.

Brazed aluminum heat exchangers often have an alternating stack of corrugated fins disposed in a cross-flow arrangement. When the corrugations are laid out with the fins of one layer running perpendicular to its adjacent layers, the stacked layers become self-supporting, one above the other. Such uniform support ensures that each layer of corrugated fins are in intimate contact with flat aluminum sheets that divide one layer from the next, thus the entire heat exchanger can be brazed in a single vacuum brazing operation.

BRIEF DESCRIPTION OF THE DRAWINGS

FIG. 15 is a partial end view similar to FIG. 14 but showing a weld fillet having a shorter depth.

FIG. 16 is a partial end view similar to FIG. 15 but showing an alternate weld process.

FIG. 17 is a partial end view similar to FIGS. 15 and 16 but showing yet another weld process.

FIG. 18 is an exploded end view showing another method of making a heat exchanger.

FIG. 19 is an end view showing a heat exchanger being brazed in a vacuum oven.

DESCRIPTION OF THE PREFERRED EMBODIMENT

Figure 1:
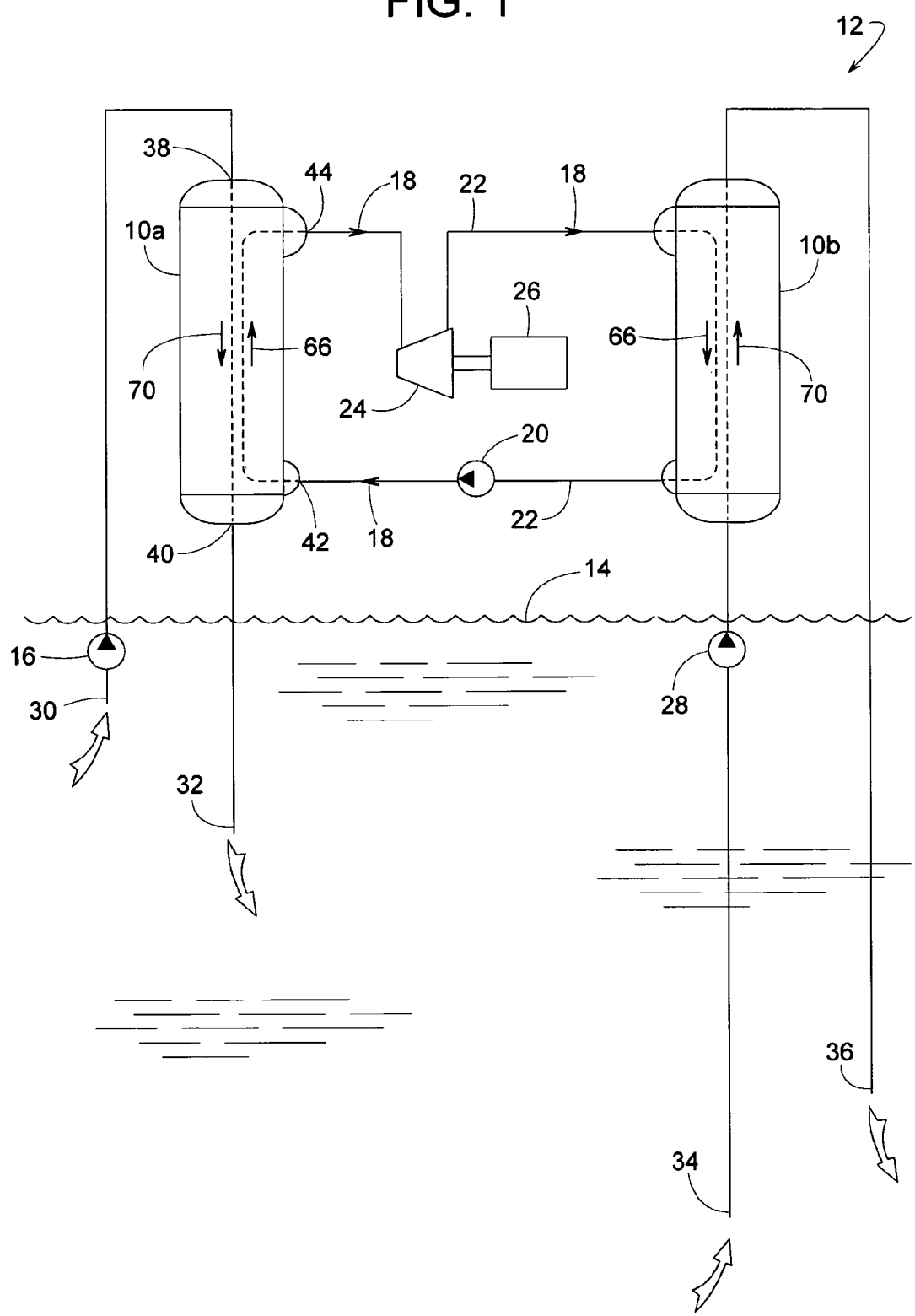
FIG. 1 is a schematic diagram of an Ocean Thermal Energy Conversion system with a brazed aluminum heat exchanger.

FIGS. 1-6 illustrate a brazed aluminum heat exchanger 10 that is particularly suited for use in Ocean Thermal Energy Conversion (OTEC). FIG. 1 shows an OTEC heat exchanger system 12 with two such heat exchangers 10a and 10b transferring heat with a suitable body of water 14 (e.g., a tropical ocean).

To extract useful heat from the body of water 14, an evaporator feed pump 16 forces relatively warm water 14 from near the surface of body 14 through heat exchanger 10a. Heat exchanger 10a transfers the water's heat to a refrigerant or working fluid 18 (e.g., ammonia) that a working fluid pump 20 circulates through a closed loop circuit 22. As working fluid 18 is heated within heat exchanger 10a, fluid 18 vaporizes under pressure. The pressurized vapor is used to drive a turbine 24 that powers an electric generator 26. As fluid 18 flows through turbine 24, the fluid's pressure decreases. The lower pressure fluid 18 exiting turbine 24 then condenses within heat exchanger 10b. In the condensing process, heat exchanger 10b transfers waste heat from fluid 18 to relatively cool water 14 that a condenser pump 28 conveys between heat exchanger 10b and a deep, cool location in body 14. After fluid 18 condenses, pump 20 returns fluid 18 back to heat exchanger 10a to perpetuate the cycle.

To minimize the environmental impact of possibly altering the water temperature of localized areas of body 14, evaporator pump 16 draws warm water (e.g., 78° F.) from a water inlet 30 that is located near the surface of body 14 and discharges the subsequently cooled water (e.g., 75° F.) through a water outlet 32 that is at a lower depth, where the water in body 14 is at a similar temperature (e.g., 75° F.). Meanwhile, condenser pump 28 draws cold water (e.g., 39° F.) from a water inlet 34 at a depth much lower that outlet 32 and discharges the subsequently heated water (e.g., 43° F.) through a water outlet 36 that is at a depth between that of inlet 34 and outlet 32, i.e., where the water in body 14 is at a similar temperature (e.g., 43° F.).

To achieve the required heat transfer efficiency at such relatively small temperature differentials and to do so at a reasonable cost, heat exchangers 10a and 10b are of a counter-flow design as shown in FIGS. 2-6 and can be manufactured as shown in FIG. 7-20. Since heat exchangers 10a and 10b are so similar, and perhaps even identical, FIGS. 2-20 often refer to heat exchangers 10a and 10b simply as an equivalent heat exchanger 10.

Referring to FIGS. 2-6, heat exchanger 10 comprises a water inlet 38, a water outlet 40, a working fluid inlet 42, a working fluid outlet 44, and an alternating stacked arrangement 46 of corrugated layers 48 and open layers 50. Each corrugated layer 48 comprises a corrugated sheet 52, an upper sheet 54a, a lower sheet 54b, a first lateral bar 56a, and a second lateral bar 56b, all of which preferably are made of aluminum (e.g., 3003 aluminum). Corrugated sheet 52 extends between lateral bars 56a and 56b (bars 56) and is sandwiched between sheets 54*a* and 54*b* (sheets 54), thereby creating a first fluid passageway 68 that runs along corrugated sheet 52 within the confines of sheets 54*a* and 54*b* and lateral bars 56*a* and 56*b*.

Each open layer 50 comprises a first spacer bar 48 and a second spacer bar 58*b* interposed between an upper sheet 54*a* of one corrugated layer 48 and a lower sheet 54*b* of another corrugated layer 48, thereby creating a second fluid passageway 60 within the confines of spacer bars 58*a* and 58*b* (bars 58) and sheets 54*a* and 54*b*. Aluminum side plates 62 can finish the two outermost open layers.

Figure 2:
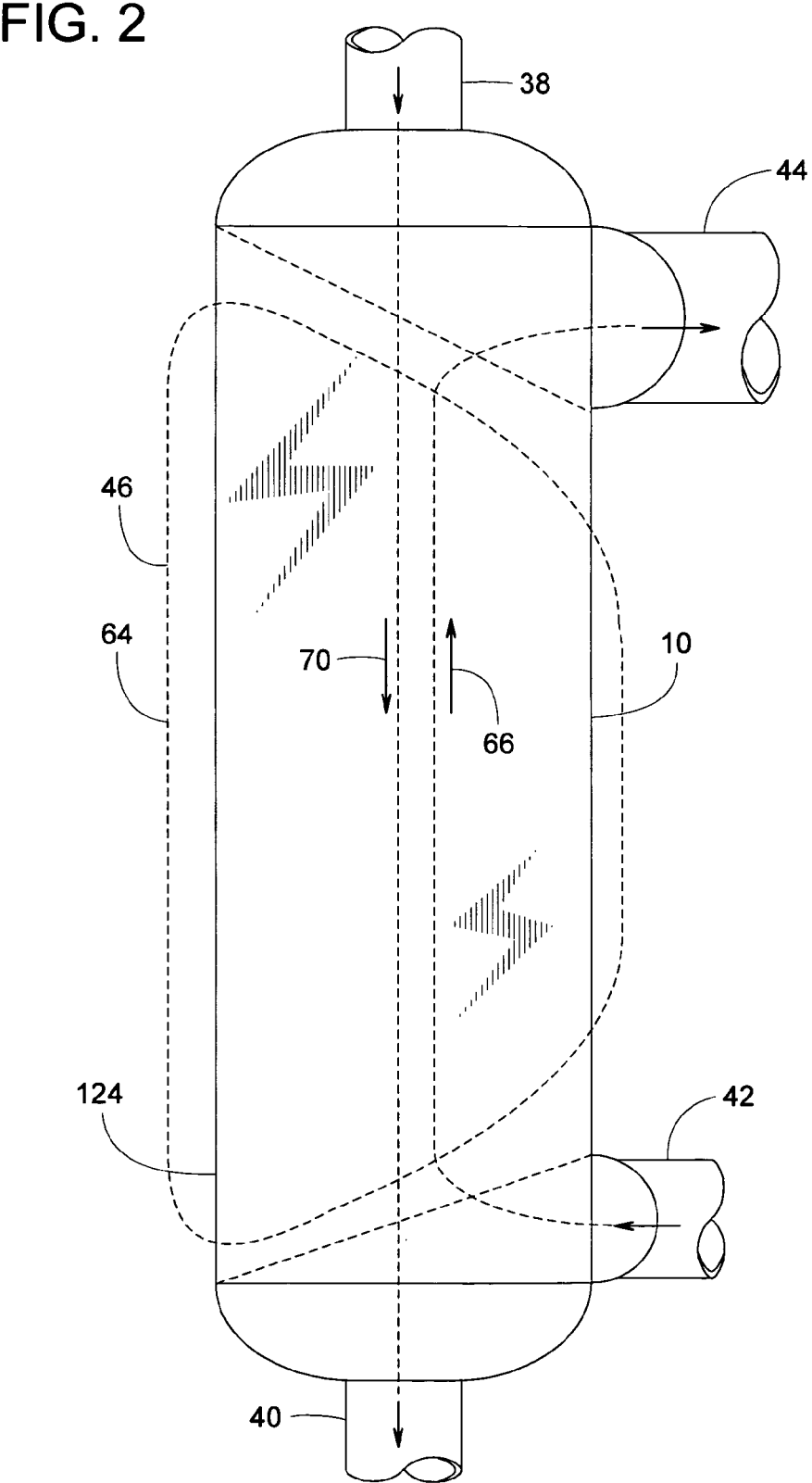
FIG. 2 is a front view of the heat exchanger of FIG. 1.
Figure 3:
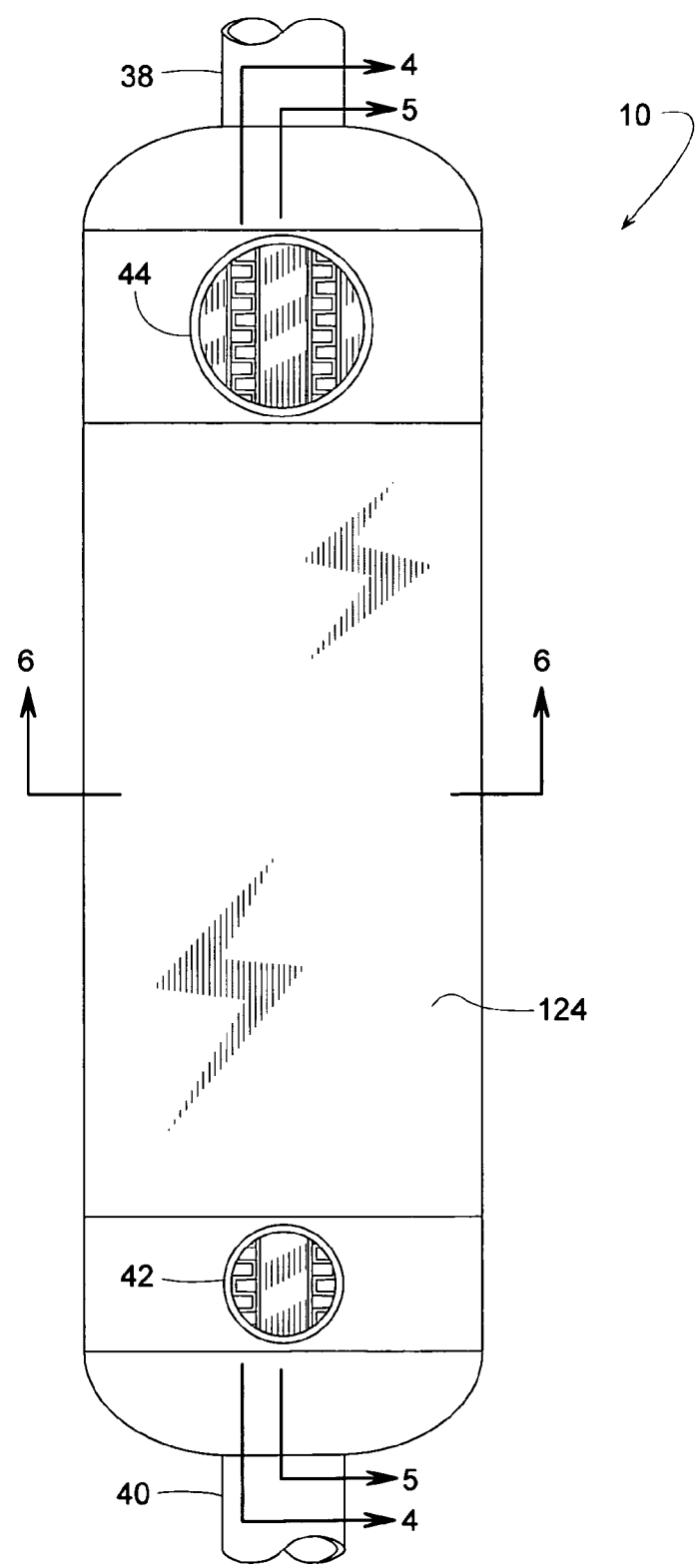
FIG. 3 is a side view of FIG. 2.

To maximize the heat transfer relationship between fluid 18 flowing through the first plurality of fluid passageways 68 and water 14 flowing through the second plurality of fluid passageways 60, fluid passageways 52 and 60 are laid out in a counter-flow relationship such that in a central, main portion 64 of heat exchanger 10, water 14 and fluid 18 flow in opposite directions in generally parallel flow streams, as indicated by fluid flow arrow 66 and water flow arrow 70 of FIGS. 1 and 2.

Figure 4:
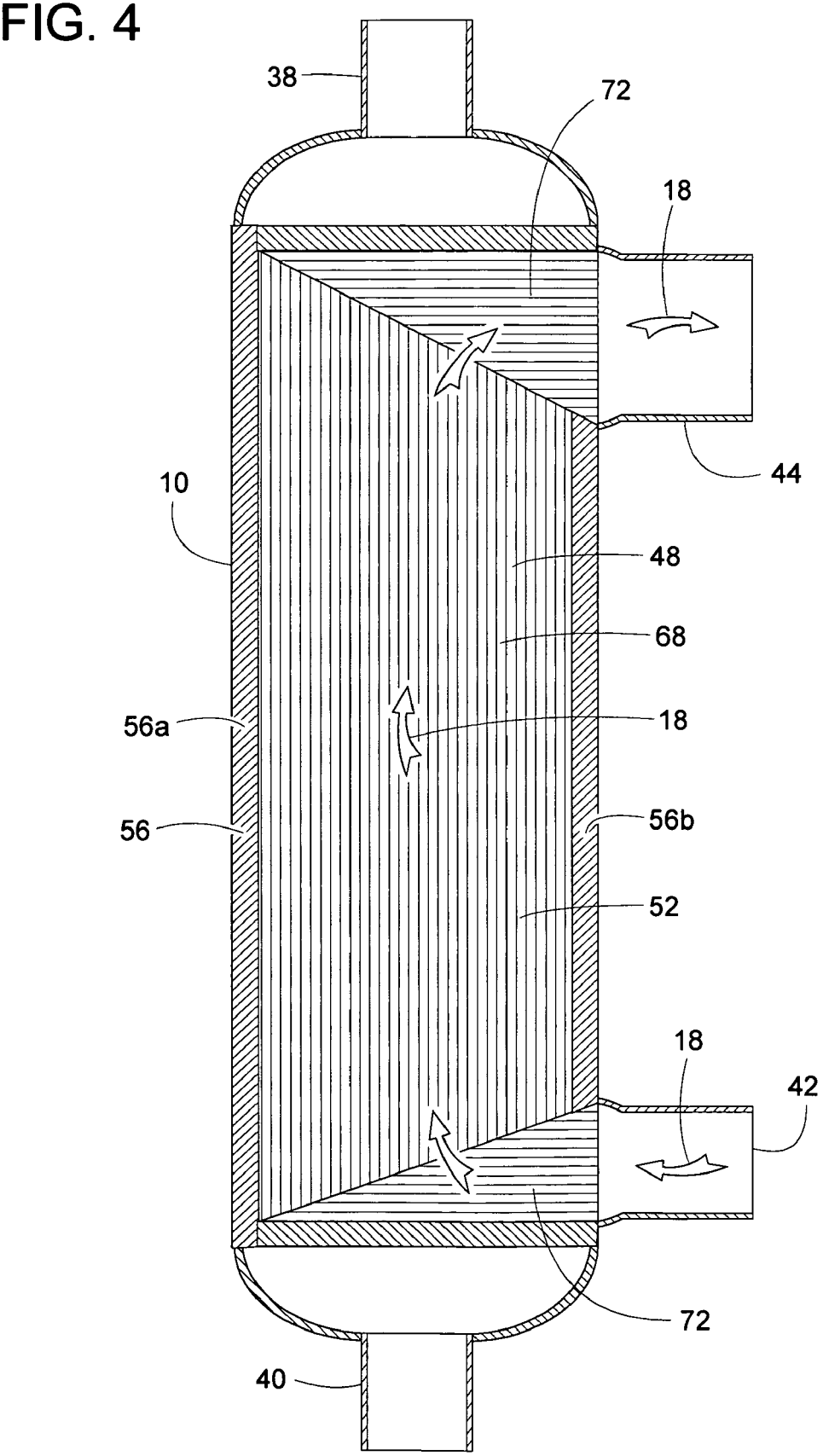
FIG. 4 is a cross-sectional view taken along line 4-4 of FIG. 3.
Figure 5:
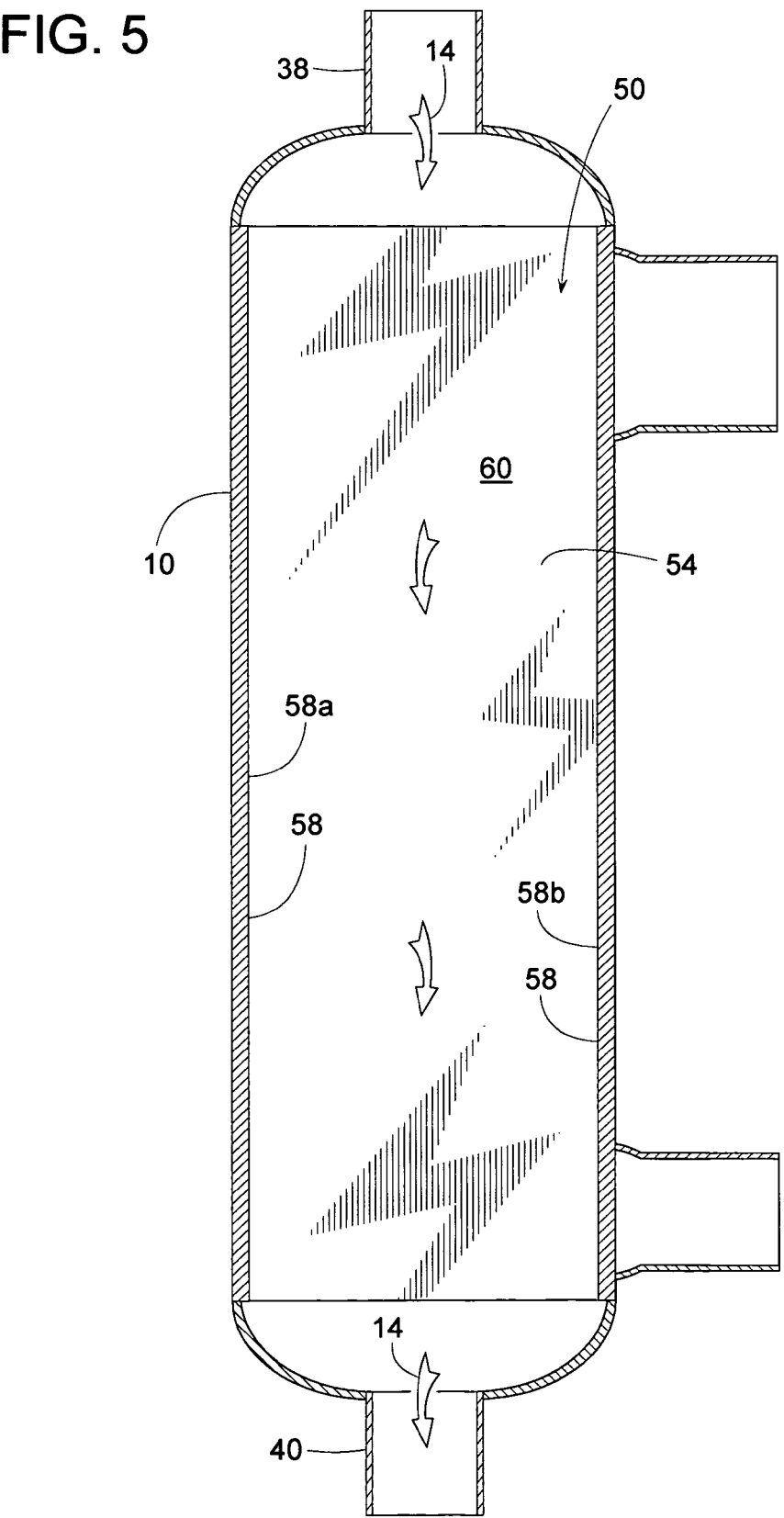
FIG. 5 is a cross-sectional view taken along line 5-5 of FIG. 3.

FIG. 4 shows fluid 18 flowing sequentially through inlet 42, first fluid passageway 68, and outlet 44. If necessary, any suitable turning sections 72 can be used for guiding fluid 18 from inlet 42 to passageway 68 and for guiding fluid 18 from passageway 68 to outlet 40. In this example, turning sections 72 are simply triangular pieces of corrugated sheets similar in construction to that of corrugated sheets 52. FIG. 5 shows water 14 flowing generally straight through open layers 50 with water 14 flowing sequentially through inlet 38, second passageway 60, and outlet 40.

Figure 6:
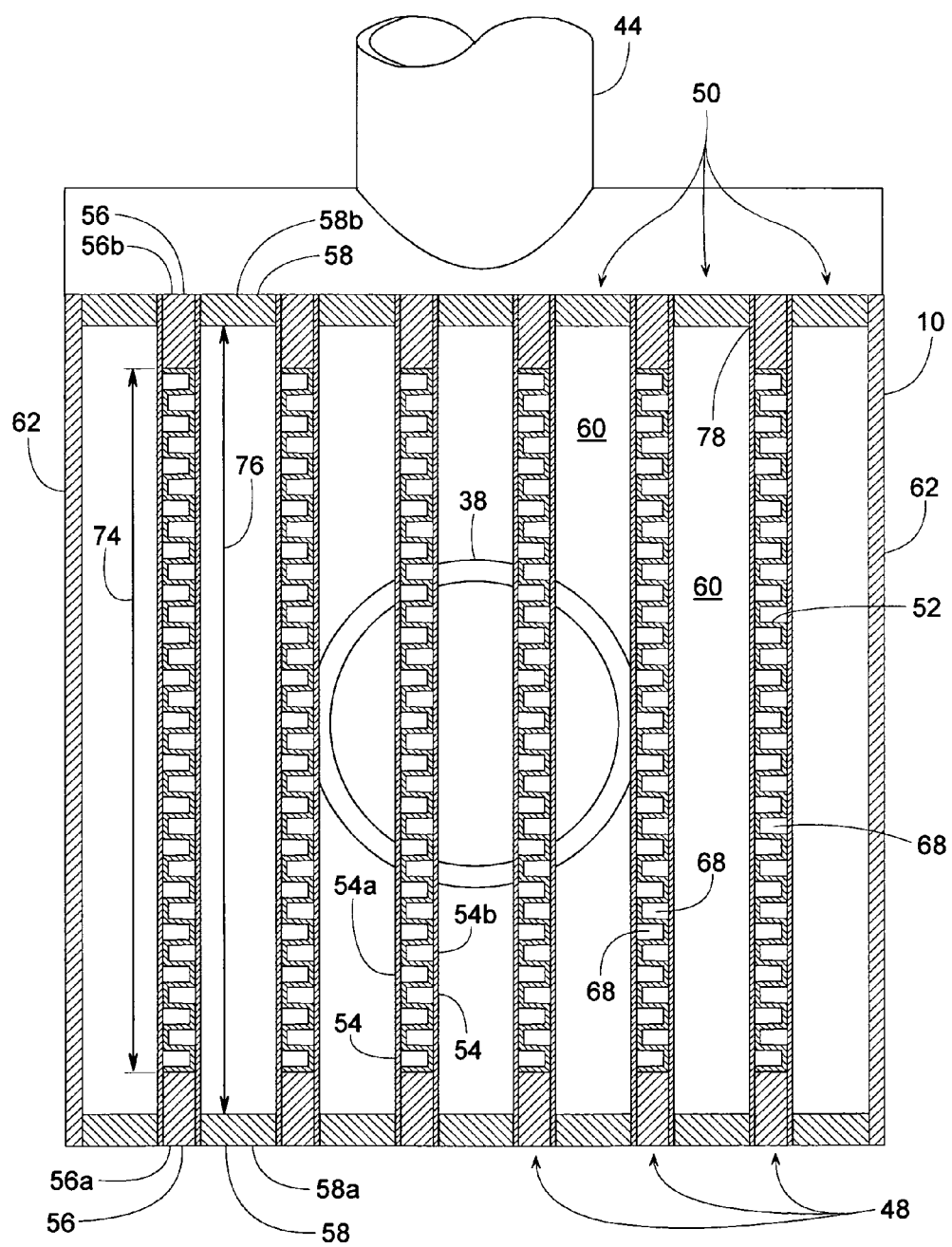
FIG. 6 is a cross-sectional view taken along line 6-6 of FIG. 3.

FIG. 6 shows additional construction details of heat exchanger 10. For instance, passageway 68 has a first width 74, and passageway 60 has a second width 76, wherein second width 76 is greater than first width 74. This design feature is particularly important in avoiding or mitigating the adversity of a corrosion-conducive crevice or interface that might exist at an inside corner 78 of passageway 60. By having passageway 60 wider than passageway 74, lateral bars 56 extend farther into heat exchanger 10 than do spacer bars 58, thus any corrosion beginning at corner 78 would tend to erode into the relatively thick bars 56 and 58 without penetrating or reaching first passageway 68. Consequently, it would be unlikely for such a path of corrosion to create leakage path through the relatively thin sheets 54 in an area that would lead to first passageway 68.

Figure 7:
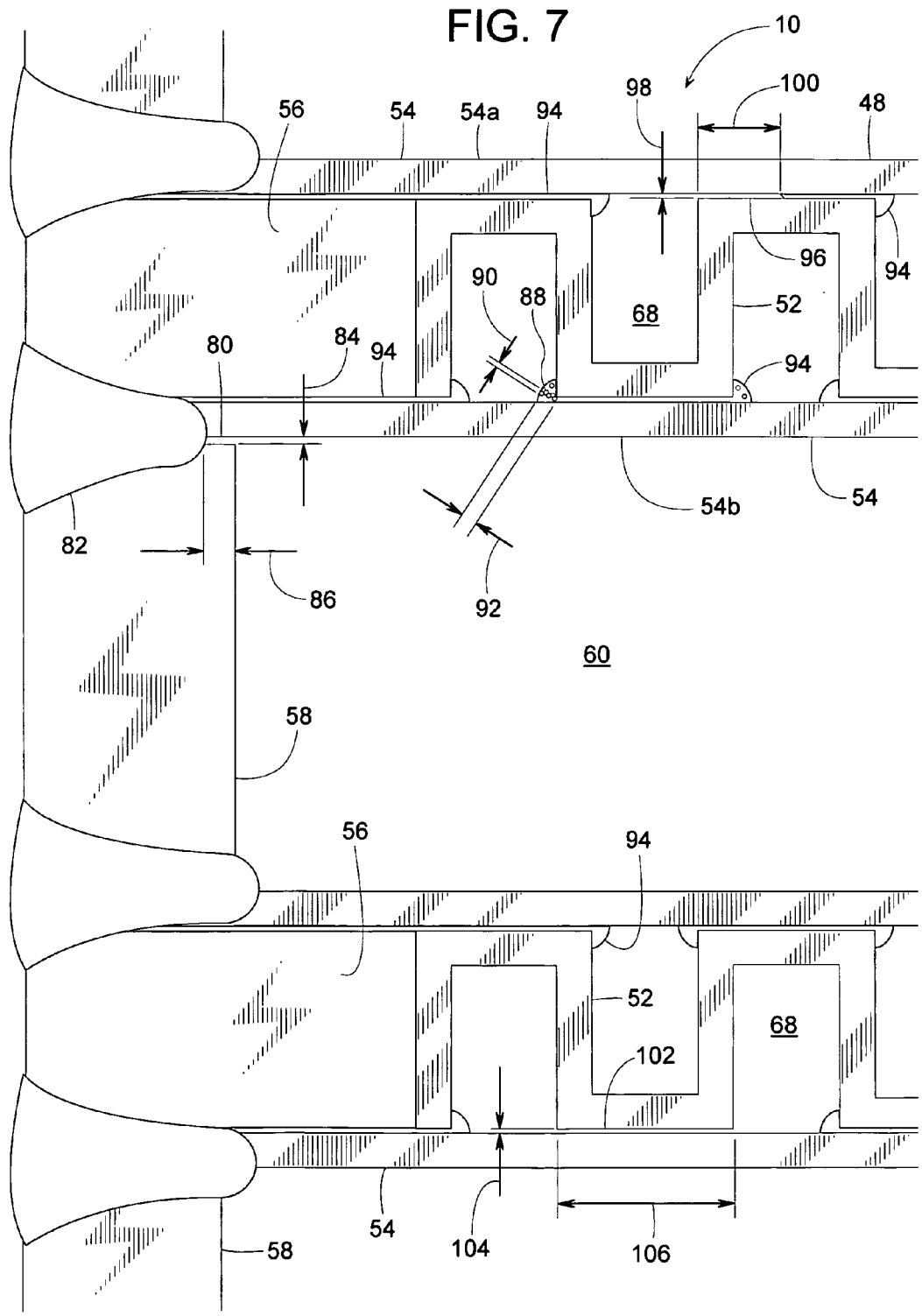
FIG. 7 is an enlarged section view of FIG. 14.

The term, "crevice" and the expression, "corrosion-conducive crevice" refers to a narrow gap at a joint, wherein the term, "narrow gap" refers to a concavity having a spaced-apart dimension (width) of less than one-tenth of an inch and having a depth greater than or equal to the spaced-apart dimension. For example, a crack 0.001 inches wide and 0.125 inches deep, regardless of its length, would be considered a corrosion-conducive crevice if such a crack were at a joint (e.g., brazed joint, welded joint, or two otherwise adjacent pieces). Examples of corrosion-conducive crevices are shown in FIG. 7. A crevice 80 at a weld fillet 82 has a width 84 and a depth 86. A crevice 88, which has a width 90 and depth 92, can be caused by silicon particles in a brazing material 94, wherein the particles are sufficiently large and/or numerous to create an interconnected string of particles that leave a crevice once the particles corrode away. A crevice 96, having a width 98 and a depth 100, is created by brazing material 94 failing to fully span a joint. A crevice 102, having a width 104 and a depth 106, can be caused by an excessive gap between sheet 54 and corrugated sheet 52 or caused by insufficient brazing material 94 at the joint.

FIGS. 8-14 illustrate a method of making heat exchanger 10, wherein corrugated layers 48 are evenly clamped and supported while they are being brazed, yet the adjacent open layers 50 can be fully open without the need for intermediate supports for corrugated layers 48. Moreover, the method can be carried out while making efficient use of a vacuum brazing oven 108.

Figure 8:
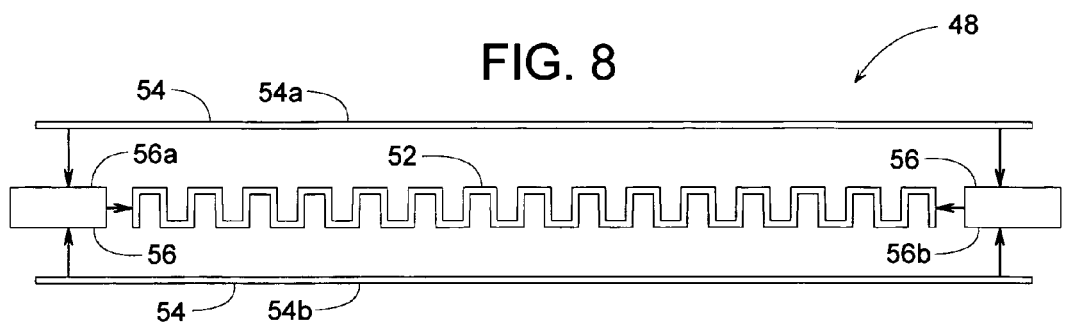
FIG. 8 is an exploded view showing a corrugated layer being assembled.

To begin, FIG. 8 shows the step of arranging corrugated sheet 52, two lateral bars 56 and two sheets 54*a* and 54*b* into one corrugated layer 48. This step is repeated to create a plurality of similar corrugated layers 48, each of which are not yet brazed.

Figure 9:
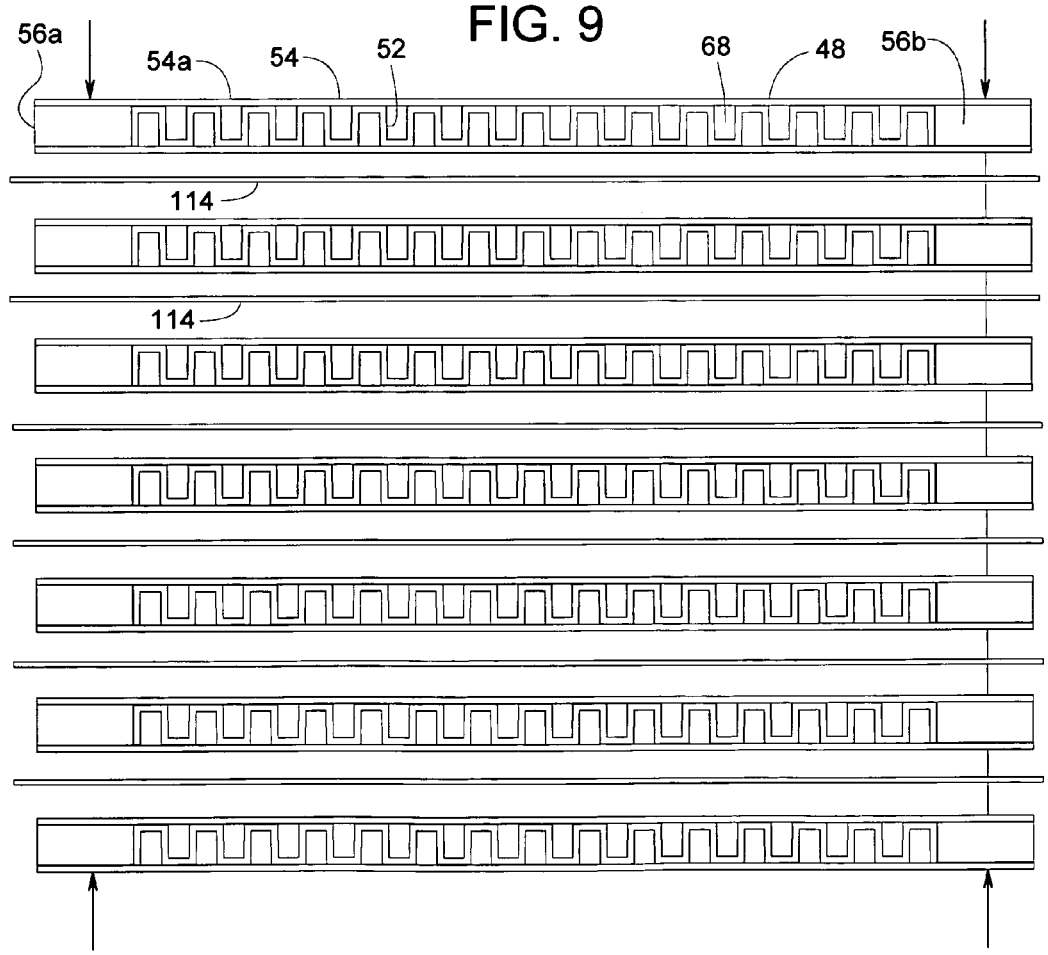
FIG. 9 is an exploded view showing a plurality of corrugated layers being stacked in a group.
Figure 10:
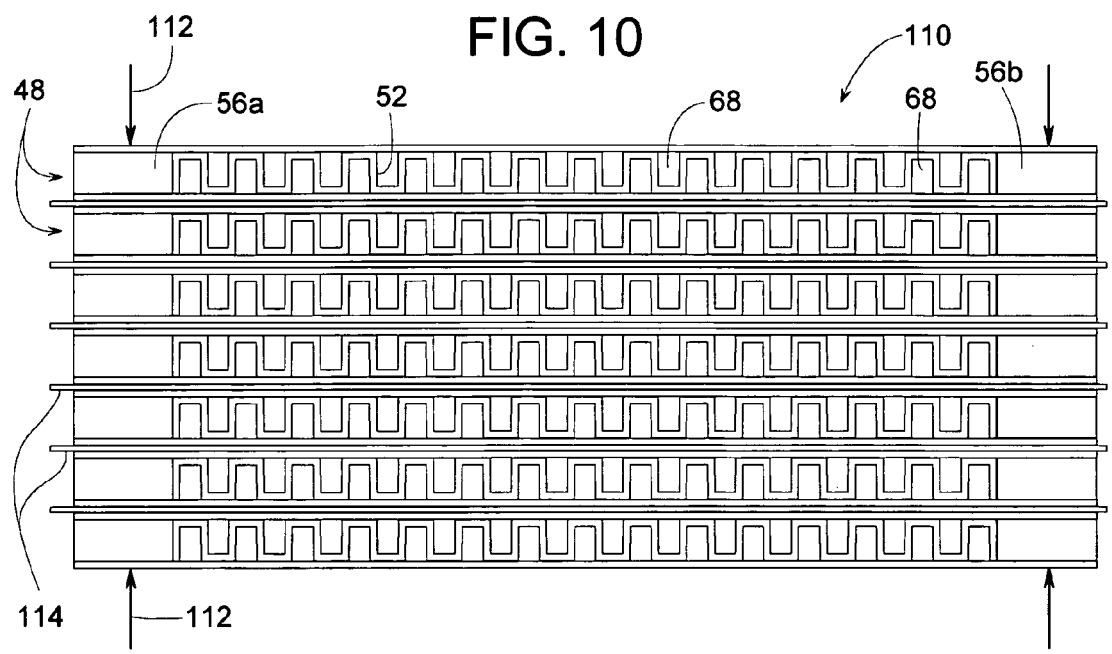
FIG. 10 is an end view showing the stacked group of FIG. 9 being clamped together.

FIGS. 9 and 10 illustrate arranging and clamping together the unbrazed corrugated layers 48 in a temporary stacked group 110. The step of clamping, as schematically represented by arrows 112, can be carried out by any means including, but not limited to, a mechanical clamp, pneumatic bladder, and/or an applied deadweight. To prevent the corrugated layers 48 from being brazed to each other while still arranged in stacked group 110, a plurality of parting sheets 114 can be installed between adjacent corrugated layers 48. Parting sheet 114 can be made of stainless steel or any other material that resists being brazed to corrugated layers 48. If there is no brazing material 94 between adjacent corrugated layers 48, it might be possible to eliminate the need for parting sheets 114.

Figure 11:
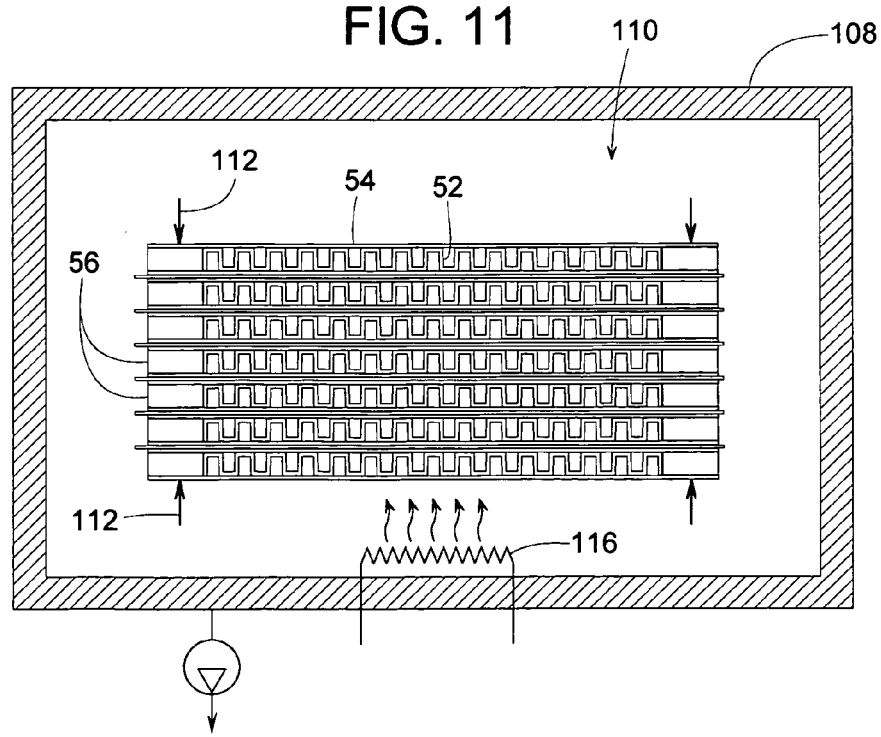
FIG. 11 is an end view showing the stacked group of FIG. 10 being brazed in a vacuum oven.

FIG. 11 shows the stacked group 110 of corrugated layers 48 being brazed under a vacuum within oven 108. The term, "vacuum" refers to a subatmospheric pressure and specifically an absolute pressure of less than 10 psia, and preferably substantially less than that. Oven 108 includes a heat source 116 that heats the group of corrugated layers 110 to a first temperature that is less than a melting temperature of the aluminum in lateral bars 56, sheets 54, and corrugated sheet 52 but is greater than the initial melting temperature of the brazing material 94 (FIG. 7) that is between the adjoining faces or interfaces of corrugated sheet 52, sheets 54, and lateral bars 56. Corrugated sheet 52, sheets 54, and lateral bars 56 can all be made of 3003 aluminum; however, other materials plated or otherwise can be used. Brazing material 94 can be made of an aluminum silicon alloy (e.g., aluminum with 5% to 12% silicon by weight or more or less). Brazing material 94 can be a clad coating on adjoining surfaces of corrugated sheet 52, sheets 54, and lateral bars 56; or brazing material 94 can be in the form of thin foil strips installed (prior to brazing) between the interfaces of corrugated sheet 52, sheets 54, and lateral bars 56.

Figure 12:
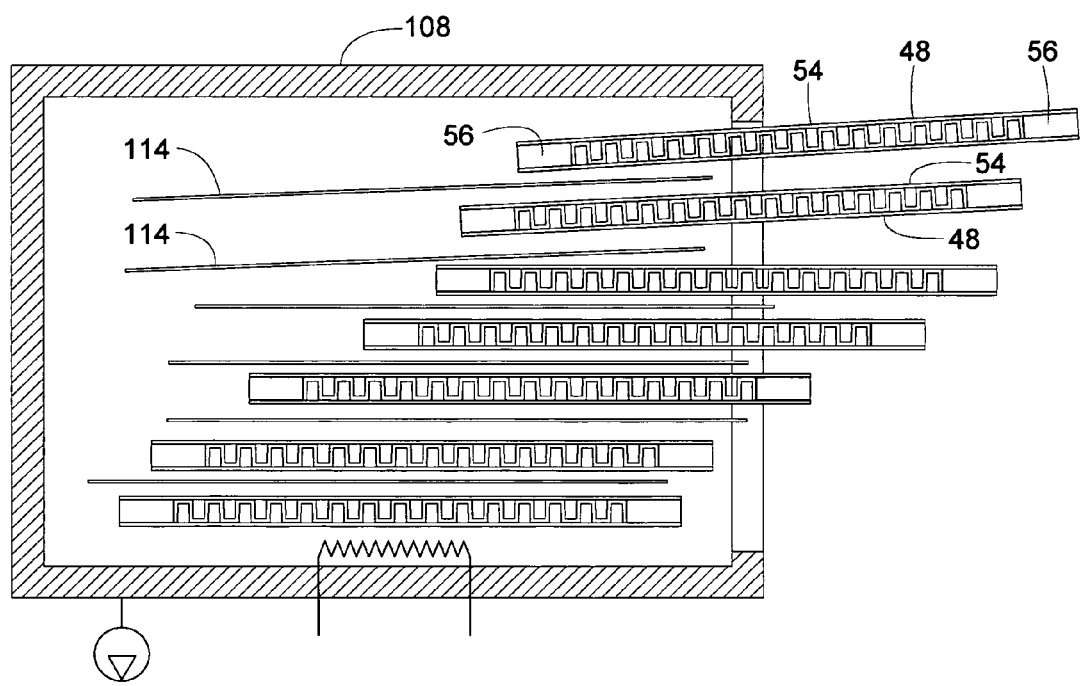
FIG. 12 is an end view showing the brazed corrugated layers being unstacked and removed from the vacuum oven.

After the brazing step illustrated in FIG. 11, the stacked group of corrugated layers 48 are unclamped and unstacked, and the now-brazed corrugated layers 48 and parting sheets 114 (if any) are removed from oven 108, as shown in FIG. 12. Parting sheets 114 can be discarded or used another time.

Figure 13:
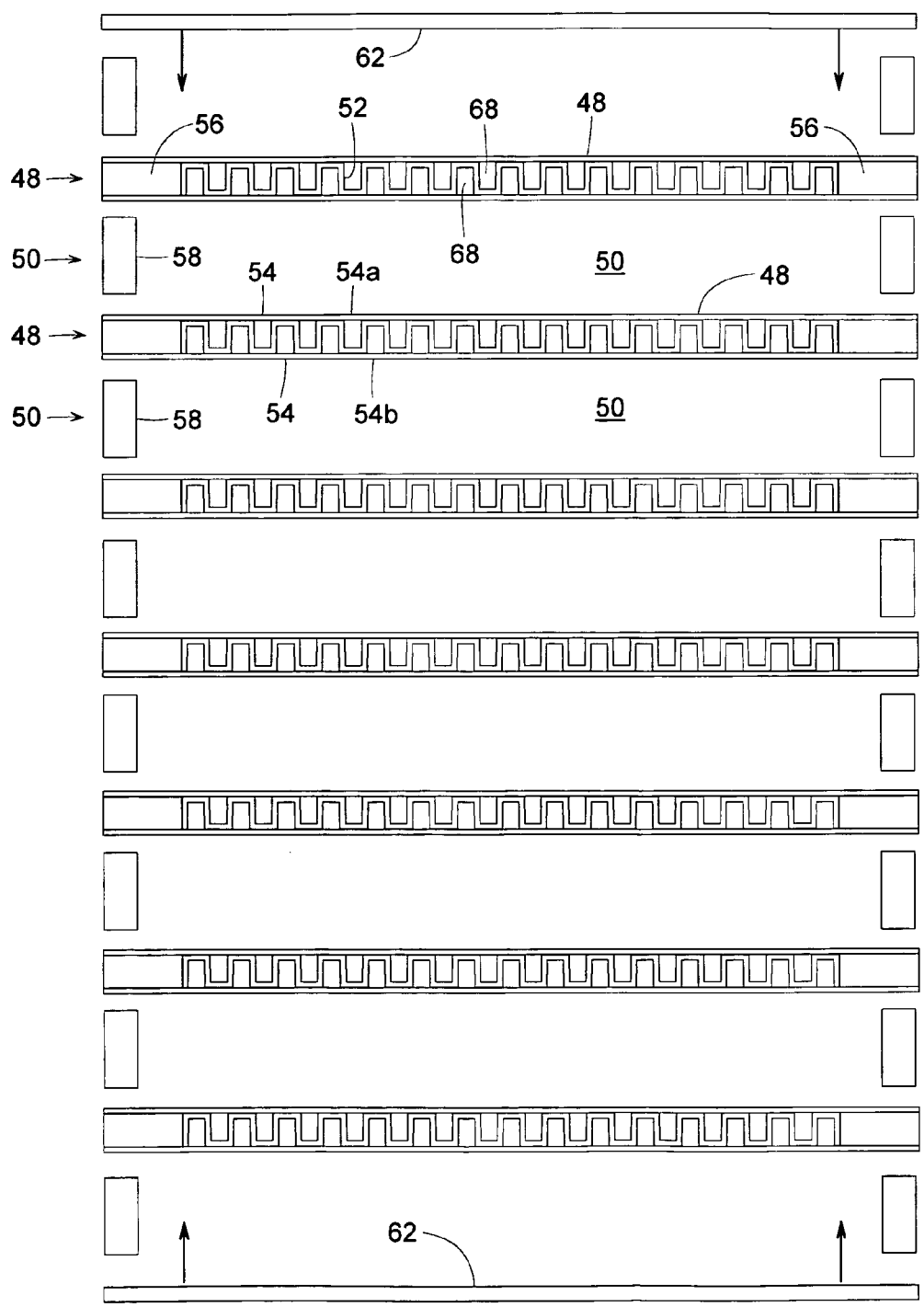
FIG. 13 is an end view showing the brazed corrugated layers being stacked in an alternating arrangement with a plurality of open layers.
Figure 14:
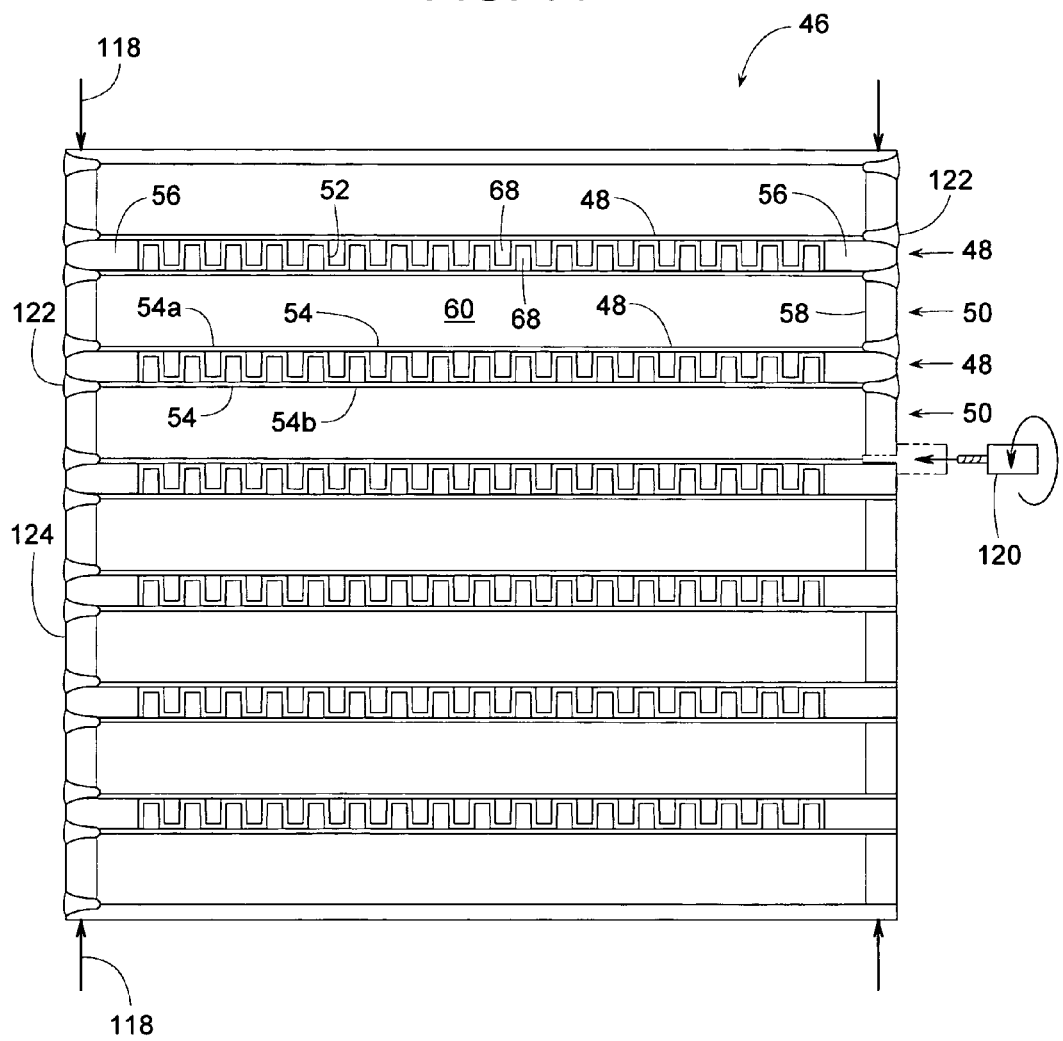
FIG. 14 is an end view showing the alternating stacked arrangement being welded together.

FIGS. 13 and 14 illustrate the step of rearranging the plurality of brazed corrugated layers 48 in the alternating stacked arrangement 46 with the plurality of open layers 50. With lateral bars 56 and spacer bars 58 extending longitudinally in substantially parallel relationship to each other, the alternating stacked arrangement 46 is clamped together (arrows 118) to facilitate the welding together of somewhat adjacent bars 56 and 58, wherein the expression, "somewhat adjacent" refers to bars 56 and 58 actually being separated by a relatively thin sheet 54.

In FIG. 14, the illustrated welding step is carried out by way of a friction stir welding process 120, wherein a rotating and/or oscillating tool is forced to travel along the length of bars 56 and 58 to weld them together (along with sheet 54) at a friction-generated temperature that is less than the melting temperature of bars 56 and 58. The resulting joint produces a fillet 122 (similar or equal to fillet 82 of FIG. 7) that extends between bars 56 and 58. The term, "fillet" refers to a material that joins two distinct pieces. Fillet 122 can be comprised of the same material as bars 56 and 58, and for the illustrated example, bars 56 and 58 actually contribute to the material of fillet 122. Fillet 122 can be recessed, protrude, or be generally flush with an exterior surface 124 of heat exchanger 10. If fillet 122 is flush with surface 124, the existence of fillet 122 may still be evident by microscopic inspection and/or chemical etching of a cross-sectional sample of the subject joint.

To minimize or eliminate a corrosion-conducive crevice, which may exist at assembly prior to welding, the root of fillet 122 preferably extends into or is exposed to second fluid passageway 60 without penetrating first fluid passageway 68. Such a fillet is illustrated in FIG. 14.

Alternatively, but perhaps not as desirable, is a fillet 126 shown in FIG. 15, wherein the root of fillet 126 terminates short of corner 78.

Although friction stir welding provides a proficient way of welding heat exchanger 10, other slower welding processes are possible including, but not limited to, MIG and TIG. The term, "braze" refers to metallurgical bonding by melting an intermediate material at a temperature that is below the melting temperature of the base metal, and the term, "weld" usually refers to metallurgical bonding at a temperature that is at or above the melting temperature of the base metal; however, friction stir welding is known to occur at a temperature that is below the melting temperature of the base metal. More information about friction stir welding is disclosed in U.S. Pat. Nos. 5,460,317 and 5,813,592, which are specifically incorporated by reference herein.

FIG. 16 illustrates a MIG welding process 128. In this example, a removable backup bar 130 is used in conjunction with the MIG welding process 128 to achieve full penetration of a fillet 132 so that the fillet's root is exposed to passageway 60 without fillet 132 leaving a gaping melted hole through the joint. After a joint is welded with full penetration, backup bar 130 is removed.

Since it might be difficult or impossible to use backup bar 130 within the confines of a partially assembled heat exchanger, FIG. 17 shows a spacer bar 134 initially being comprised of two separate, parts 136 and 138. First, parts 136 and 138 are welded to lateral bars 56, then adjacent parts 136 and 138 are welded to each other using a friction stir welding tool 140. Tool 140 includes an integral backup mandrel 142 to create a welded joint 144 with full weld penetration. Once welded together, parts 136 and 138 provide a complete spacer bar 134.

FIGS. 18-21 illustrate another method of making a heat exchanger similar to heat exchanger 10. The method comprises assembling (FIG. 18) corrugated sheet 52, first lateral bar 56a, second lateral bar 56b, upper sheet 54a and lower sheet 54b. Corrugated sheet 52, first lateral bar 56a, second lateral bar 56b, upper sheet 54a and lower sheet 54b comprises a first corrugated layer 48 that defines a first fluid passageway 68. FIG. 18 further illustrates the step of assembling a plurality of corrugated layers 48 each similar to that of the first corrugated layer. FIG. 18 also illustrates the step of arranging the plurality of corrugated layers 48 in an alternating stacked arrangement 46' with a plurality of open layers 50', wherein each open layer 50' comprises first spacer bar 58a, second spacer bar 58b and an intermediate spacer bar 146 all of which are interposed between the upper sheet 54 of one corrugated layer and the lower sheet 54 of a second corrugated layer. Referring to FIG. 19, first spacer bar 58a, second spacer bar 58b, upper sheet 54 of one corrugated layer 48, and lower sheet 54 of a second corrugated layer 48 define a second fluid passageway 60' that contains intermediate spacer bar 146.

Intermediate spacer bar 146 can provide corrugated layers 48 with additional support that not only facilitates brazing the entire alternating stacked arrangement 46' in a single vacuum braze operation, but intermediate spacer bar 146 can also add rigidity to corrugated layers 48, which might otherwise tend to vibrate in reaction to high rates of water flow through fluid passageways 60'.

The assembly process may naturally result in creating a corrosion-conducive crevice (FIG. 7) at least partially defined by upper sheet 54, wherein the corrosion-conducive crevice is exposed to second fluid passageway 60'.

FIG. 19 illustrates the step of brazing the alternating stacked arrangement 46' under a vacuum within oven 108.

Figure 20:
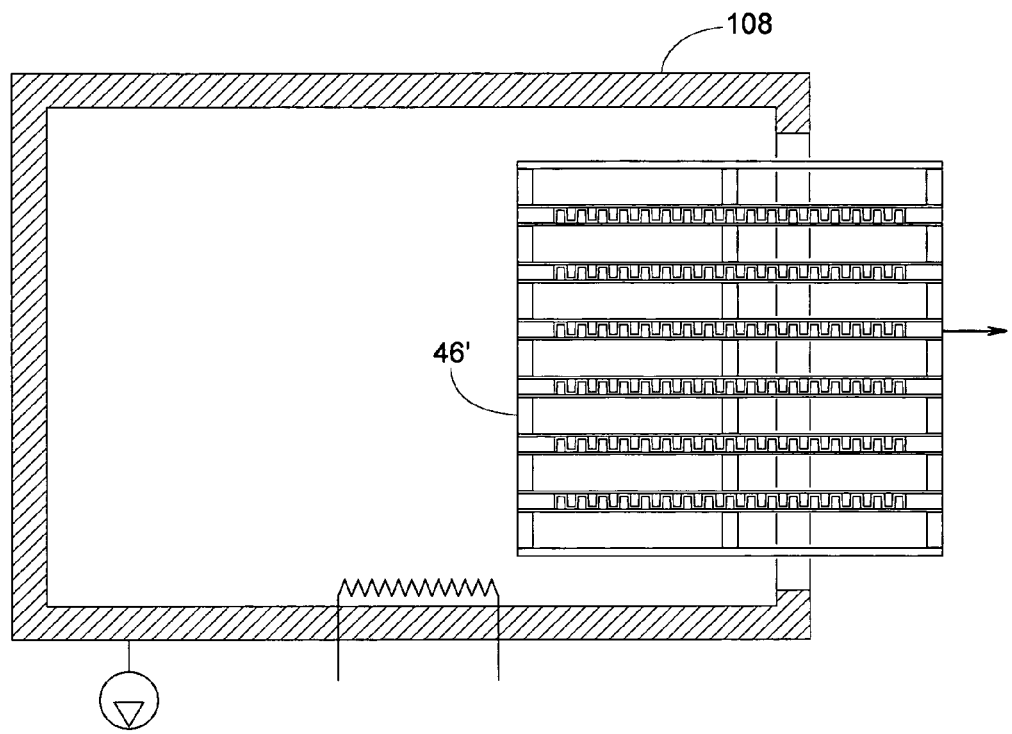
FIG. 20 is an end view showing the heat exchanger of FIG. 19 being removed from the vacuum oven.

Next, FIG. 20 illustrates the step of removing the alternating stacked arrangement 46' from oven 108.

Figure 21:
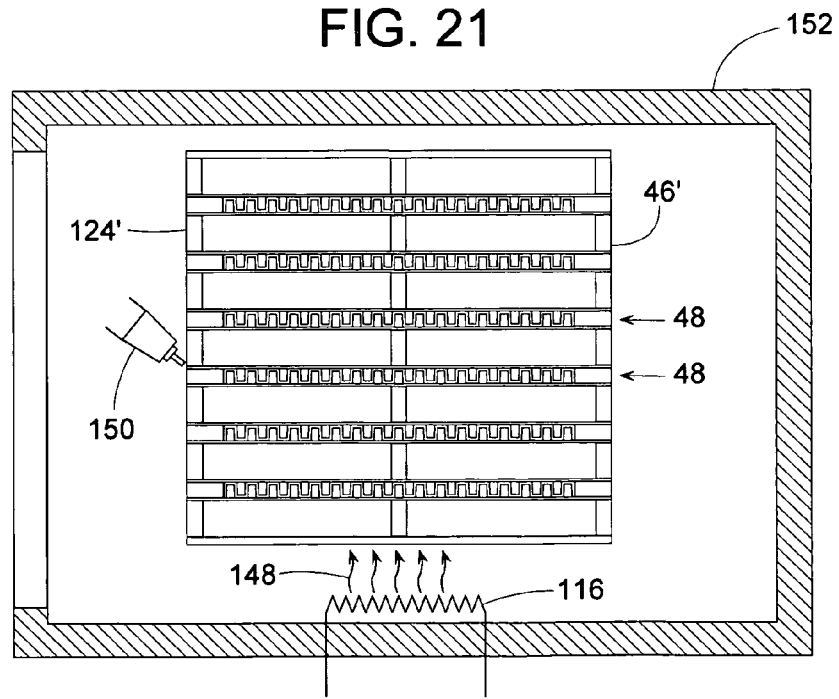
FIG. 21 is an end view showing the heat exchanger of FIG. 20 receiving a post heat operation.

After removing the alternating stacked arrangement 46' from the oven 108, FIG. 21 illustrates the step of mitigating the adversity of the corrosion-conducive crevice by applying heat 148 to the alternating stacked arrangement 46' in a post heating operation that follows the vacuum brazing operation. The step of applying post heat to the alternating stacked arrangement 46' can be accomplished by perhaps welding 150 an external surface 124' of the alternating stacked arrangement 46'. The post heat operation, however, preferably is achieved by inserting the alternating stacked arrangement 46' in another oven 152 other than vacuum oven 108, and heating the alternating stacked arrangement 46' for several hours. The heat causes the silicon particles to dissipate in the surrounding aluminum, rather than creating a bridge of particles that can lead to a corrosion-conducive crevice.

In a post heating operation or a brazing operation, it may be desirable to have the alternating stacked arrangement 46 such that the layers are in a vertical orientation to prevent the corrugated layers from drooping into the open layers. In some embodiments, for example, after the steps illustrated in FIGS. 8-13, instead of finishing the unit by welding, as shown in FIG. 14, the alternating stacked arrangement 46 of FIG. 14 could instead be returned to vacuum oven 108 for brazing bars 56 and 58 in place, rather than welding them. During this second brazing operation (FIG. 11 being the first brazing operation), the alternating stacked arrangement 46 preferably is turned so that corrugated layers 48 are oriented vertically while in oven 108.

In at least some of the aforementioned embodiments include one or more features and/or benefits including, but not limited to, the following:

In some embodiments, a counter-flow heat exchanger with brazed layers includes lateral bars and spacer bars that are of different widths to avoid creating a corrosion-conducive crevice that could otherwise readily lead to a leak between adjacent fluid passageways.

In some embodiments, a friction stir welding process provides finish exterior weld seams that penetrate to an internal passageway in a brazed aluminum heat exchanger.

In some embodiments, a heat exchanger is produced by assembling and welding subassemblies that were previously vacuumed brazed in a stacked group.

In some embodiments, a vacuum brazed heat exchanger is reheated in a post heat oven to mitigate the adversity of corrosion-conducive crevices.

In some embodiments, a vacuum brazed heat exchanger is made to be particularly suited for use in Ocean Thermal Energy Conversion.

Although the invention is described with respect to a preferred embodiment, modifications thereto will be apparent to those of ordinary skill in the art. The scope of the invention, therefore, is to be determined by reference to the following claims:

The invention claimed is:

1. A heat exchanger method, comprising:
brazing within a vacuum a corrugated sheet, a first lateral bar and a second lateral bar to an upper sheet and a lower sheet such that the corrugated sheet is between the first lateral bar and the second lateral bar, and the corrugated sheet is between the upper sheet and the lower sheet, whereby the corrugated sheet, the first lateral bar, the second lateral bar, the upper sheet and the lower sheet comprises a first corrugated layer that defines a first fluid passageway;
creating a plurality of corrugated layers each in a substantially same manner to that of the first corrugated layer; and
after creating the plurality of corrugated layers by brazing within a vacuum, rearranging the plurality of corrugated layers in an alternating stacked arrangement with a plurality of open layers, wherein each open layer comprises a first spacer bar and a second spacer bar interposed between the upper sheet of one corrugated layer and the lower sheet of a second corrugated layer, wherein:
a) the first spacer bar, the second spacer bar, the upper sheet of the one corrugated layer, and the lower sheet of the second corrugated layer define a second fluid passageway;
b) the first fluid passageway and the second fluid passageway are in counter-flow relationship to each other;
c) the first lateral bar and the first spacer bar extend longitudinally in substantially parallel relationship to each other;
d) the second fluid passageway runs generally parallel to the first spacer bar and the second spacer bar; and
e) the first fluid passageway has a first width between the first lateral bar and the second lateral bar, the second fluid passageway has a second width between the first spacer bar and the second spacer bar, and the second width is greater than the first width.

2. The heat exchanger method of claim 1, wherein the plurality of corrugated layers are brazed as a stacked group in an oven under vacuum, and further comprising unstacking the plurality of corrugated layers after creating the plurality of corrugated layers by brazing.

3. The heat exchange method of claim 2, further comprising temporarily clamping a plurality of parting sheets among the plurality of corrugated layers, wherein the plurality of parting sheets resists brazing, thereby facilitating the step of unstacking the plurality of corrugated layers after creating the plurality of corrugated layers by brazing.

4. The heat exchanger method of claim 1, further comprising:
clamping the stacked group prior to the brazing step; and
subsequently unclamping the stacked group so that the plurality of corrugated layers can be rearranged in the alternating stacked arrangement with the plurality of open layers.

5. The heat exchanger method of claim 1, further comprising:
after creating the plurality of corrugated layers and after rearranging the plurality of corrugated layers in the alternating stacked arrangement with the plurality of open layers, welding the first lateral bar to the first spacer bar.

6. The heat exchanger method of claim 5, wherein the welding step involves a friction stir welding process.

7. The heat exchanger of claim 5, wherein the welding step creates a fillet that is exposed to the second fluid passageway but is isolated from the first passageway.

8. The heat exchanger method of claim 1, wherein the first fluid passageway has a first height between the upper sheet and the lower sheet; the second fluid passageway has a second height between the upper sheet of the one corrugated layer and the lower sheet of the second corrugated layer; and the second height is greater than the first height.

9. A heat exchanger method, comprising:
assembling a corrugated sheet, a first lateral bar a second lateral bar, an upper sheet and a lower sheet such that the corrugated sheet is between the first lateral bar and the second lateral bar, and the corrugated sheet is between the upper sheet and the lower sheet, whereby the corrugated sheet, the first lateral bar, the second lateral bar, the upper sheet and the lower sheet comprises a first corrugated layer that defines a first fluid passageway;
assembling a plurality of corrugated layers each being substantially same as the first corrugated layer;
arranging the plurality of corrugated layers in an alternating stacked arrangement with a plurality of open layers, wherein each open layer comprises a first spacer bar and a second spacer bar interposed between the upper sheet of one corrugated layer and the lower sheet of a second corrugated layer, wherein:
a) the first spacer bar, the second spacer bar, the upper sheet of the one corrugated layer, and the lower sheet of the second corrugated layer define a second fluid passageway;
b) the first fluid passageway and the second fluid passageway are in counter-flow relationship to each other;
c) the first lateral bar and the first spacer bar extend longitudinally in substantially parallel relationship to each other;
d) the second fluid passageway runs generally parallel to the first spacer bar and the second spacer bar; and
e) the first fluid passageway has a first width between the first lateral bar and the second lateral bar, the second fluid passageway has a second width between the first spacer bar and the second spacer bar, and the second width is greater than the first width;
creating a corrosion-conducive crevice at least partially defined by the upper sheet, wherein the corrosion-conducive crevice is exposed to the second fluid passageway;
brazing the alternating stacked arrangement under a vacuum within an oven;
removing the alternating stacked arrangement from the oven; and
after removing the alternating stacked arrangement from the oven, mitigating the adversity of the corrosion-conducive crevice by applying heat to the alternating stacked arrangement.

10. The heat exchanger method of claim 9, wherein the step of applying heat to the alternating stacked arrangement is by way of welding an external surface of the alternating stacked arrangement.

11. The heat exchanger method of claim 9, wherein the step of applying heat to the alternating stacked arrangement is by inserting the alternating stacked arrangement in another oven.

* * * * *